US007802633B2

(12) United States Patent
Kobayashi

(10) Patent No.: US 7,802,633 B2

(45) Date of Patent: Sep. 28, 2010

(54) REVERSIBLE VALVE ASSEMBLY FOR A PNEUMATIC TOOL

(75) Inventor: Shigeki Kobayashi, Nagano (JP)

(73) Assignee: SP Air Kabushiki Kaisha, Kamiminochi-Gun, Nagano (JP)

( * ) Notice: Subject to any disclaimer, the term of this patent is extended or adjusted under 35 U.S.C. 154(b) by 0 days.

(21) Appl. No.: 11/559,170

(22) Filed: Nov. 13, 2006

(65) Prior Publication Data

US 2008/0066937 A1 Mar. 20, 2008

Related U.S. Application Data

(60) Provisional application No. 60/825,995, filed on Sep. 18, 2006.

(51) Int. Cl.
*B23B 45/04* (2006.01)

(52) U.S. Cl. .................. 173/218; 173/169; 137/625.43

(58) Field of Classification Search ................ 310/68 A
See application file for complete search history.

(56) References Cited

U.S. PATENT DOCUMENTS

| | | | | |
|---|---|---|---|---|
| 2,673,061 | A * | 3/1954 | Broz | 251/227 |
| 2,903,111 | A * | 9/1959 | Young | 173/93.5 |
| 3,129,796 | A * | 4/1964 | Karden | 173/93.5 |
| 3,179,219 | A * | 4/1965 | Karden | 173/93.5 |
| 3,298,284 | A | 1/1967 | Alexander | |
| 3,318,390 | A * | 5/1967 | Hoza et al. | 173/178 |
| 3,951,217 | A | 4/1976 | Wallace et al. | |
| 4,236,589 | A | 12/1980 | Griffith | |
| 4,890,713 | A * | 1/1990 | Pagano | 192/142 R |
| 4,920,836 | A | 5/1990 | Sugimoto et al. | |
| 5,083,619 | A | 1/1992 | Giardino et al. | |
| 5,199,460 | A | 4/1993 | Geiger | |
| 5,213,136 | A | 5/1993 | Thorp et al. | |
| 5,269,768 | A * | 12/1993 | Cheung | 604/248 |
| 5,303,781 | A | 4/1994 | Lin | |
| 5,377,769 | A | 1/1995 | Hasuo et al. | |
| 5,797,462 | A | 8/1998 | Rahn | |
| 5,918,686 | A | 7/1999 | Izumisawa | |
| 6,431,846 | B1 | 8/2002 | Zinck | |
| 6,443,239 | B1 | 9/2002 | Izumisawa | |
| 6,634,438 | B1 | 10/2003 | Pusateri et al. | |
| 6,796,386 | B2 | 9/2004 | Izumisawa et al. | |
| 6,883,619 | B1 * | 4/2005 | Huang | 173/93.5 |
| 6,938,706 | B2 * | 9/2005 | Ng | 173/216 |
| 7,487,844 | B2 * | 2/2009 | DeCicco et al. | 173/2 |
| 2003/0010514 | A1 * | 1/2003 | Taga | 173/213 |
| 2003/0075348 | A1 * | 4/2003 | Eardley et al. | 173/169 |

(Continued)

*Primary Examiner*—Rinaldi I. Rada
*Assistant Examiner*—Lindsay Low
(74) *Attorney, Agent, or Firm*—Senniger Powers LLP

(57) ABSTRACT

A pneumatic rotary tool comprises a housing, a square drive output member supported by the housing for rotational movement, and a pneumatic motor disposed in the housing for driving rotation of the square drive. A valve is disposed in the housing for rotary movement between a first position in which pressurized air powers the motor in a forward direction and a second position in which pressurized air powers the motor in a reverse direction. An actuator supported on the housing for translational movement is connected to the valve by a lost motion connection system. The lost motion connection system comprises first and second connector elements that are engaged for generally conjoint movement in a first direction and for relative sliding movement in a second direction generally perpendicular to the first direction.

11 Claims, 20 Drawing Sheets

U.S. PATENT DOCUMENTS

2003/0121680 A1 7/2003 Izumisawa et al.
2004/0144553 A1 * 7/2004 Ashbaugh .................. 173/169
2006/0102367 A1 5/2006 Etter et al.

* cited by examiner

REVERSIBLE VALVE ASSEMBLY FOR A PNEUMATIC TOOL

CROSS-REFERENCE TO RELATED APPLICATION

This application claims the benefit of U.S. Provisional Application No. 60/825,995, filed Sep. 18, 2006, and entitled Reversible Valve Assembly for a Pneumatic Tool, the entire disclosure of which is hereby incorporated by reference.

BACKGROUND OF THE INVENTION

This invention relates generally to pneumatic rotary tools and more specifically to a pneumatic rotary tool having a reversible valve assembly for controlling the direction of airflow through the tool and the direction of rotational output of the tool.

Pneumatic rotary tools are commonly used in applications where it is desirable to turn a fastener element, such as a bolt or nut, in a forward or a reverse direction for tightening or loosening it. Pneumatic rotary tools are advantageous because they can rapidly rotate the fastener element for tightening or loosening the fastener element. Some pneumatic tools are capable of imparting large amounts of torque to the fastener. This is particularly desirable in automotive repair and industrial applications where fasteners may be difficult to loosen or may require large amounts of torque to tighten.

Pneumatic rotary tools typically include an output member (e.g., a socket) sized to engage the fastener. Pressurized air flows through the tool and drives an air motor which in turn drives the socket. Air typically flows to the motor through one of two passages. When air flows through a first passage, it drives the motor in a forward (generally tightening) direction. When air flows through a second passage, it drives the motor in a reverse (generally loosening) direction.

A valve is used to direct the air flow to the first or second passage. Typically, the valve includes a directional channel to direct the air to the desired passage and an arm connected to the valve for moving the directional channel to the desired position. In many tools, the arm extends laterally outward from the tool at a location, for example, above the trigger. Alternatively, a pair of arms may be used to move the valve. In U.S. Pat. No. 5,199,460 (Geiger), for example, air flows through a tubular spool to either a forward supply port or a reverse supply port. A rack and pinion system rotates the spool and aligns it with the desired port. Two arms (racks) are located on opposite sides of the spool (pinion) so that the desired arm may be pressed into the housing to rotate the spool to the desired position. When one arm is pressed into the housing, the opposite arm moves out of the housing in a rearward direction. The outward arm can subsequently be pressed into the housing to change the position of the spool.

A drawback to valves currently used is that the structure used to move the valves (e.g., the arm(s)) often protrudes outward from the tool, leaving it susceptible to inadvertent contact or movement during operation. It would therefore be desirable to provide a pneumatic tool with a simple valve construction that securely remains in the desired operating position under normal operation conditions.

SUMMARY OF THE INVENTION

The invention is directed to a pneumatic rotary tool. The tool generally comprises a housing, an output member supported by the housing for rotational movement relative to the housing, and a pneumatic motor disposed in the housing and operatively connected to the output member for driving rotation of the output member. An inlet is provided in the housing for receiving pressurized air from a source of pressurized air to power the motor. Passaging in the housing directs the pressurized air from the inlet to the pneumatic motor. A valve having a longitudinal axis is disposed in the passaging for one of rotary and translational movement between a first position in which pressurized air in the passaging is directed to power the pneumatic motor in a forward direction and a second position in which pressurized air in the passaging is directed to power the pneumatic motor in a reverse direction. The tool further comprises an actuator supported on the housing for the other of rotary and translational movement relative to the housing. A lost motion connection system interconnects the actuator and the valve. The connection system comprises first and second connector elements that are engaged for generally conjoint movement in a first direction and for relative sliding movement in a second direction generally perpendicular to the first direction.

In another aspect, the tool generally comprises a housing, an output member supported by the housing for rotational movement relative to the housing, and a pneumatic motor disposed in the housing and operatively connected to the output member for driving rotation of the output member. An inlet is provided in the housing for receiving pressurized air from a source of pressurized air to power the motor. Passaging in the housing directs the pressurized air from the inlet to the pneumatic motor. A valve is disposed in the passaging for movement between a first position in which pressurized air in the passaging is directed to power the pneumatic motor in a forward direction and a second position in which pressurized air in the passaging is directed to power the pneumatic motor in a reverse direction. The tool further comprises an actuator supported on the housing for moving the valve between the first position and the second position.

Other features of the invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE INVENTION

Figure 1:
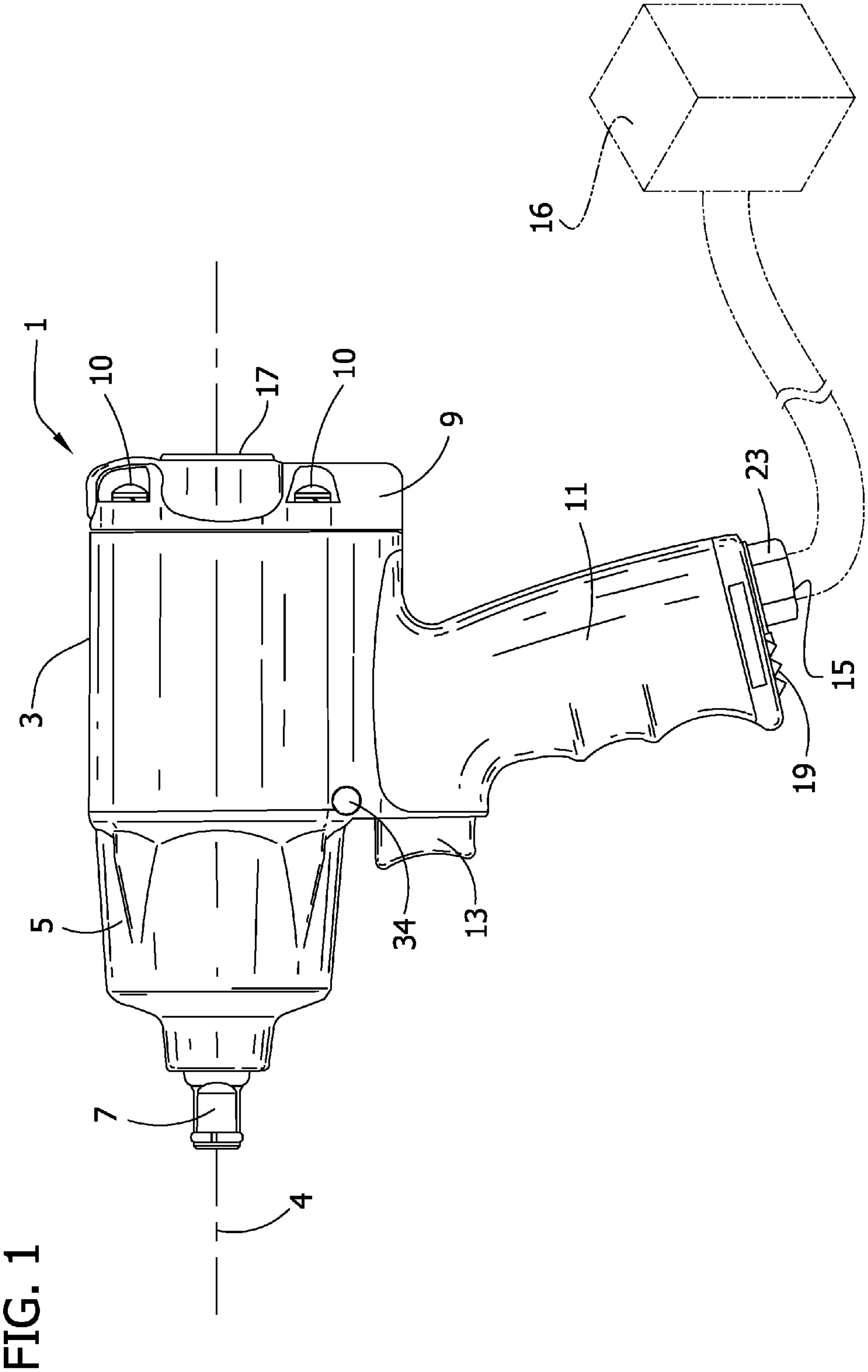
FIG. 1 is a side elevation of a pneumatic rotary tool according to a first embodiment of the invention.

Referring now to the drawings and particularly to FIG. 1, a first embodiment of a pneumatic rotary tool of the present invention is indicated generally at 1. In the drawings, the tool 1 is illustrated as an impact wrench and generally comprises a housing (indicated generally at 3) having an axis 4, a clutch casing 5 at the front of the housing 3, an output member 7 extending forward out of the clutch casing 5, and an end cover 9 mounted on the rear of the housing 3. The output member 7 is supported by the housing 3 for rotational movement relative to the housing about the axis 4. The output member 7 is illustrated as a square drive, but may be shaped differently within the scope of the invention. Four threaded fasteners 10, for example bolts, extend through the end cover 9 and housing 3 and thread into the clutch casing 5, securing the tool components together. The tool components may be secured together differently, for example with different fasteners, within the scope of the invention. The tool 1 further comprises a grip 11 extending downwardly from the housing 3, allowing a user to grasp and hold the tool 1 securely. The clutch casing 5, end cover 9 and grip 11 may all be considered part of the housing 3 for purposes of the present invention. A trigger 13 extends from the front of the grip 11 for activating the tool 1, and an air inlet 15 is defined in the lower portion of the grip 11 for receiving pressurized air from a source of pressurized air 16 for supplying the pressurized air to the tool 1 as is conventional in the industry.

Figure 2:
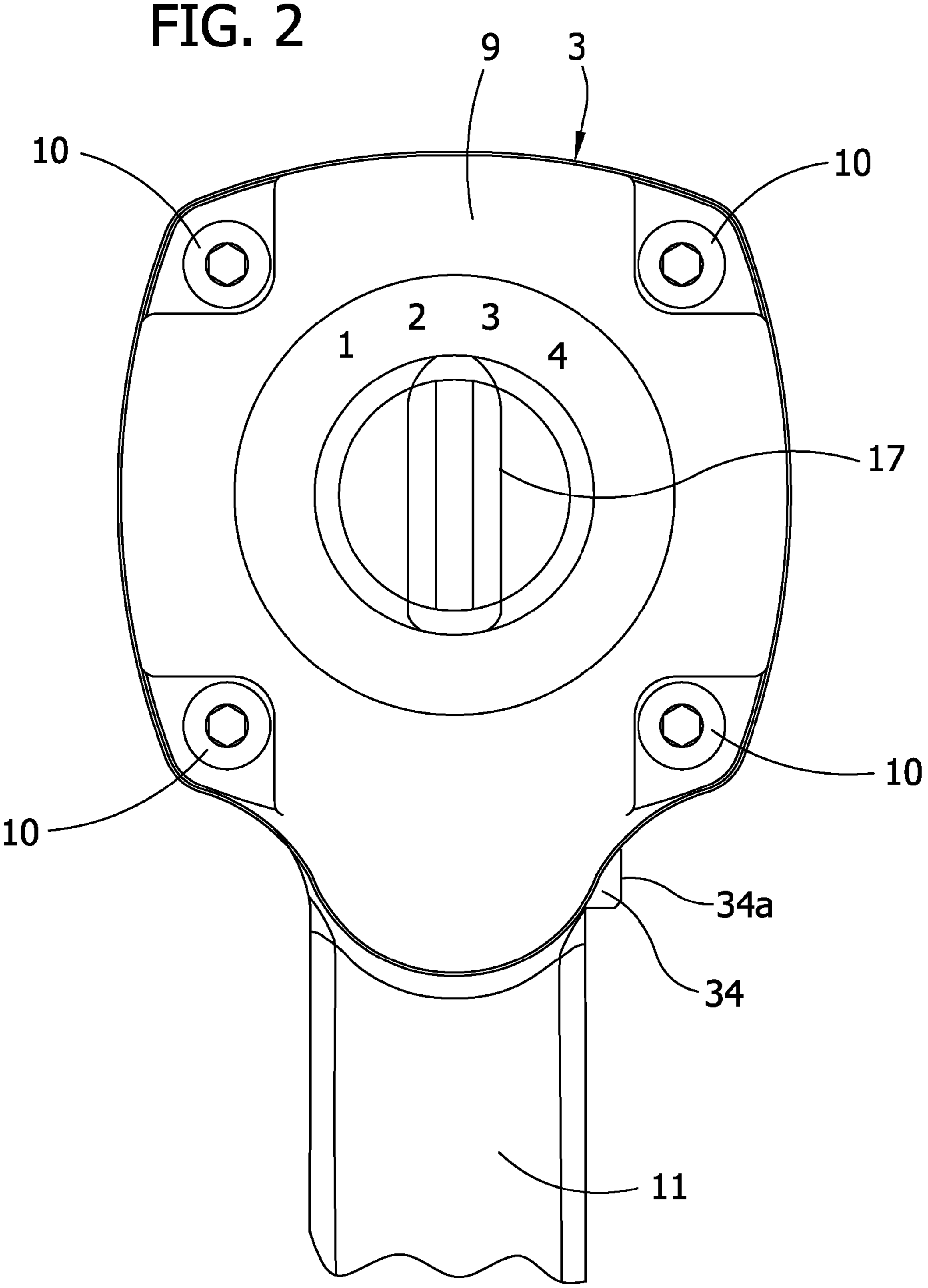
FIG. 2 is an enlarged, fragmentary rear elevation of the tool.
Figure 11:
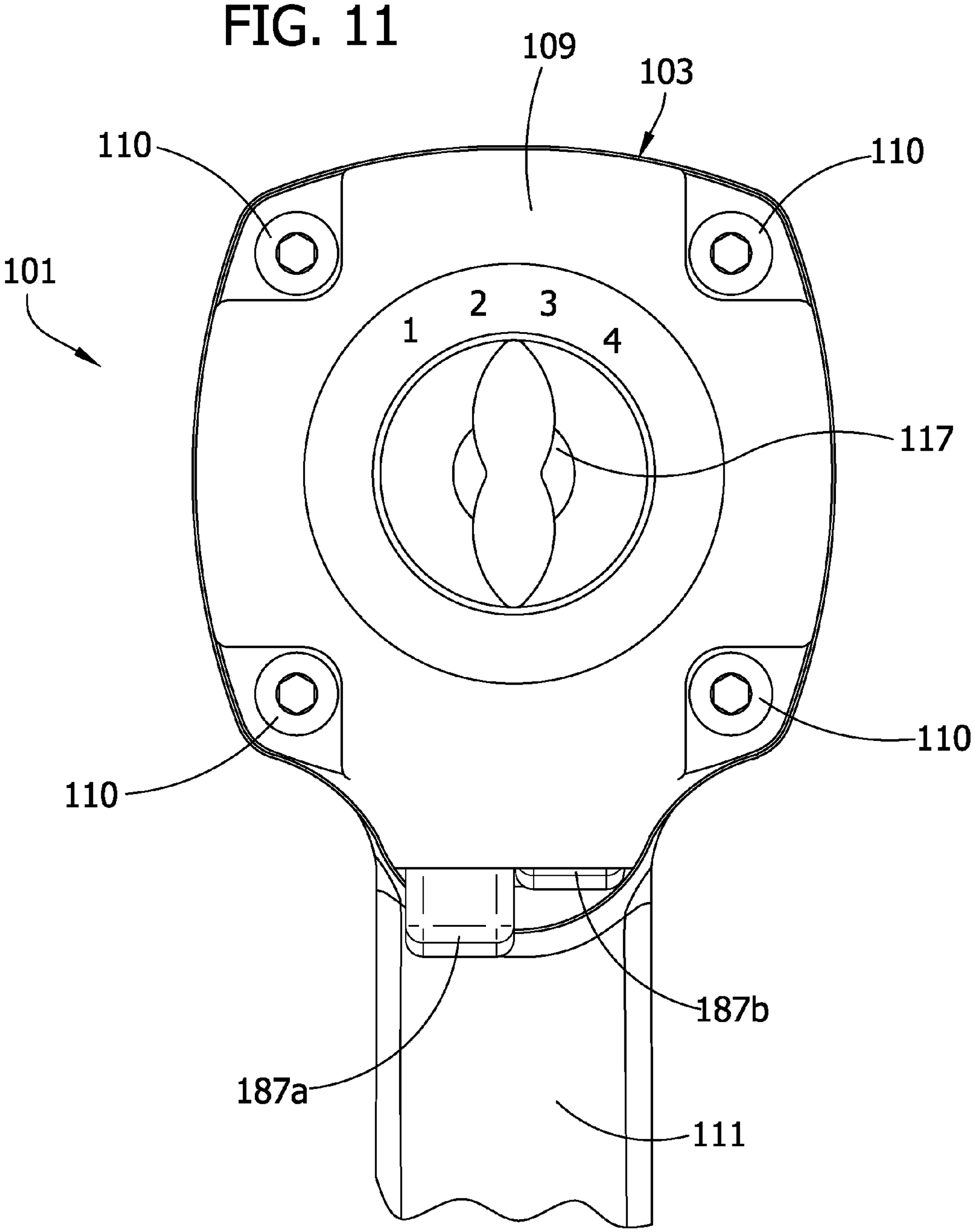
FIG. 11 is a fragmentary rear elevation of a pneumatic tool according to a second embodiment of the invention.

Referring now to FIG. 2, the tool 1 comprises a torque selector 17 mounted on the end cover 9 and rotatable within the end cover for controlling the torque of the tool 1 by throttling the flow of compressed air. In the illustrated embodiment, the torque selector 17 rotates within the end cover 9 between four discrete positions corresponding to four torque settings. The functioning of the torque selector 17 is not described further herein, but is described in detail in related, co-owned U.S. Pat. No. 6,796,386 (Izumisawa et al.). A torque selector is not necessary to practice the invention, and differently constructed torque selectors may be used within the scope of the invention (see, e.g., FIG. 11 illustrating a second embodiment of the invention in which an exterior part of a torque selector 117 is differently shaped).

Figure 3:
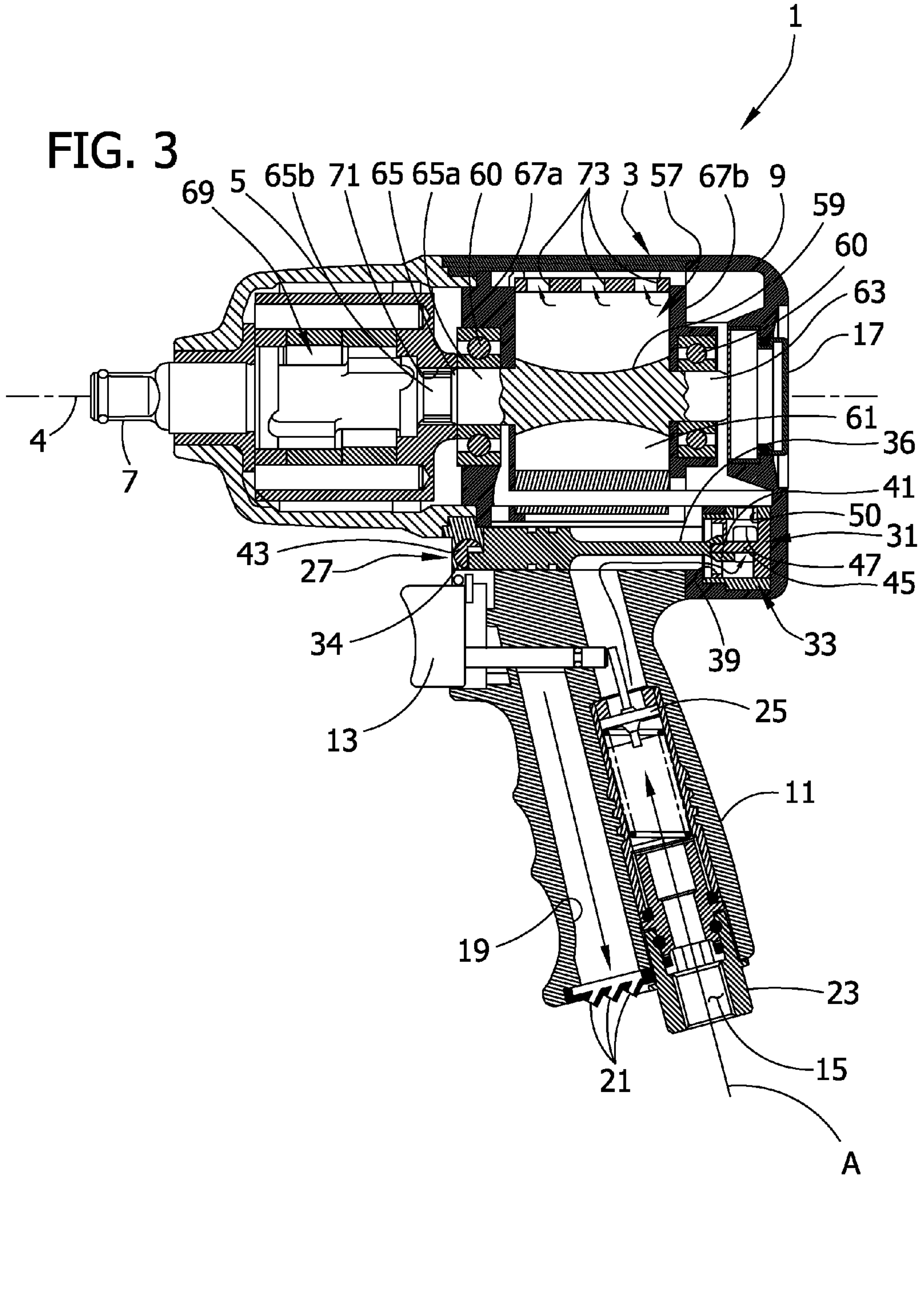
FIG. 3 is a vertical section of the tool.
Figure 4:
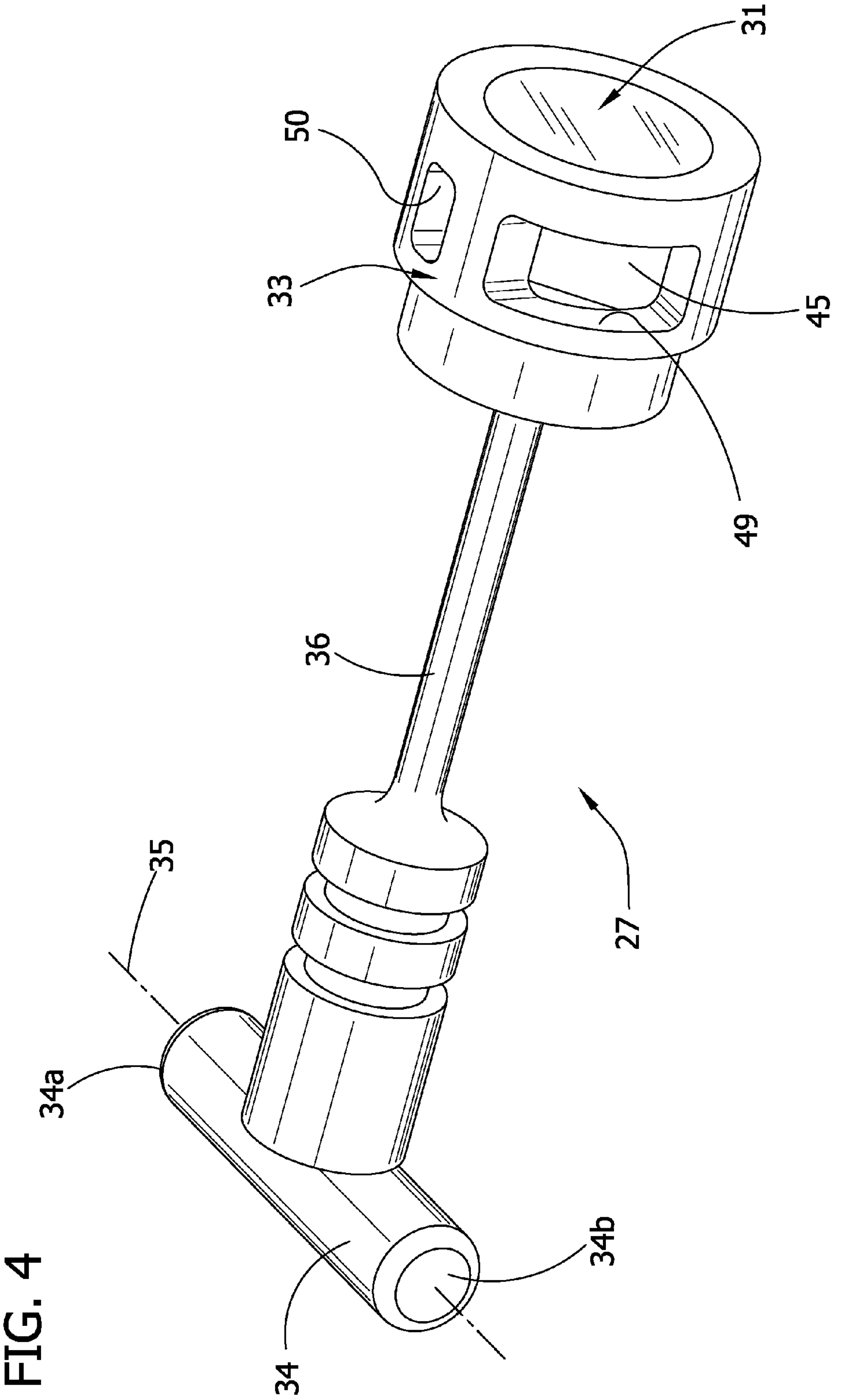
FIG. 4 is a perspective of a valve assembly of the tool.
Figure 5:
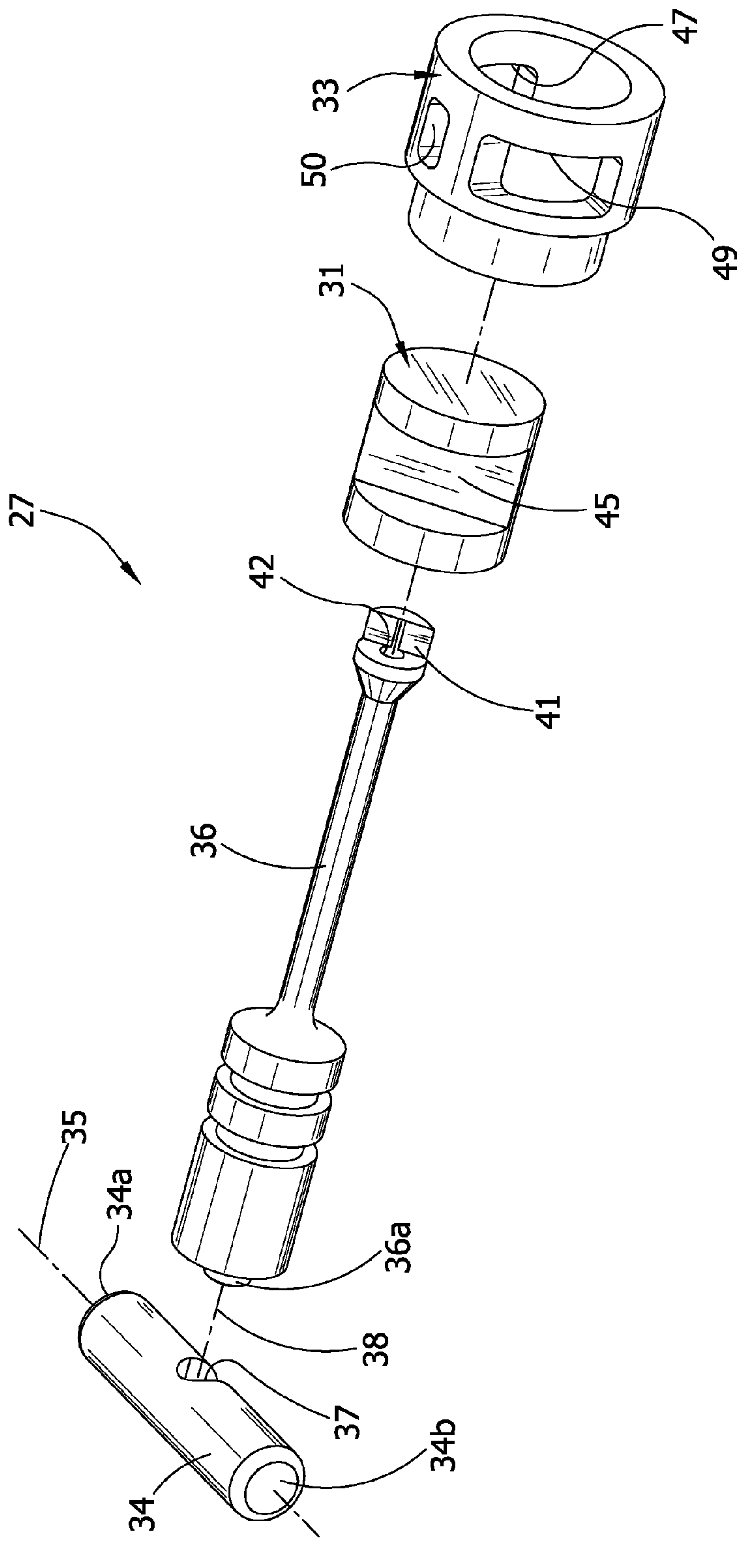
FIG. 5 is the perspective of FIG. 4 exploded.
Figure 6:
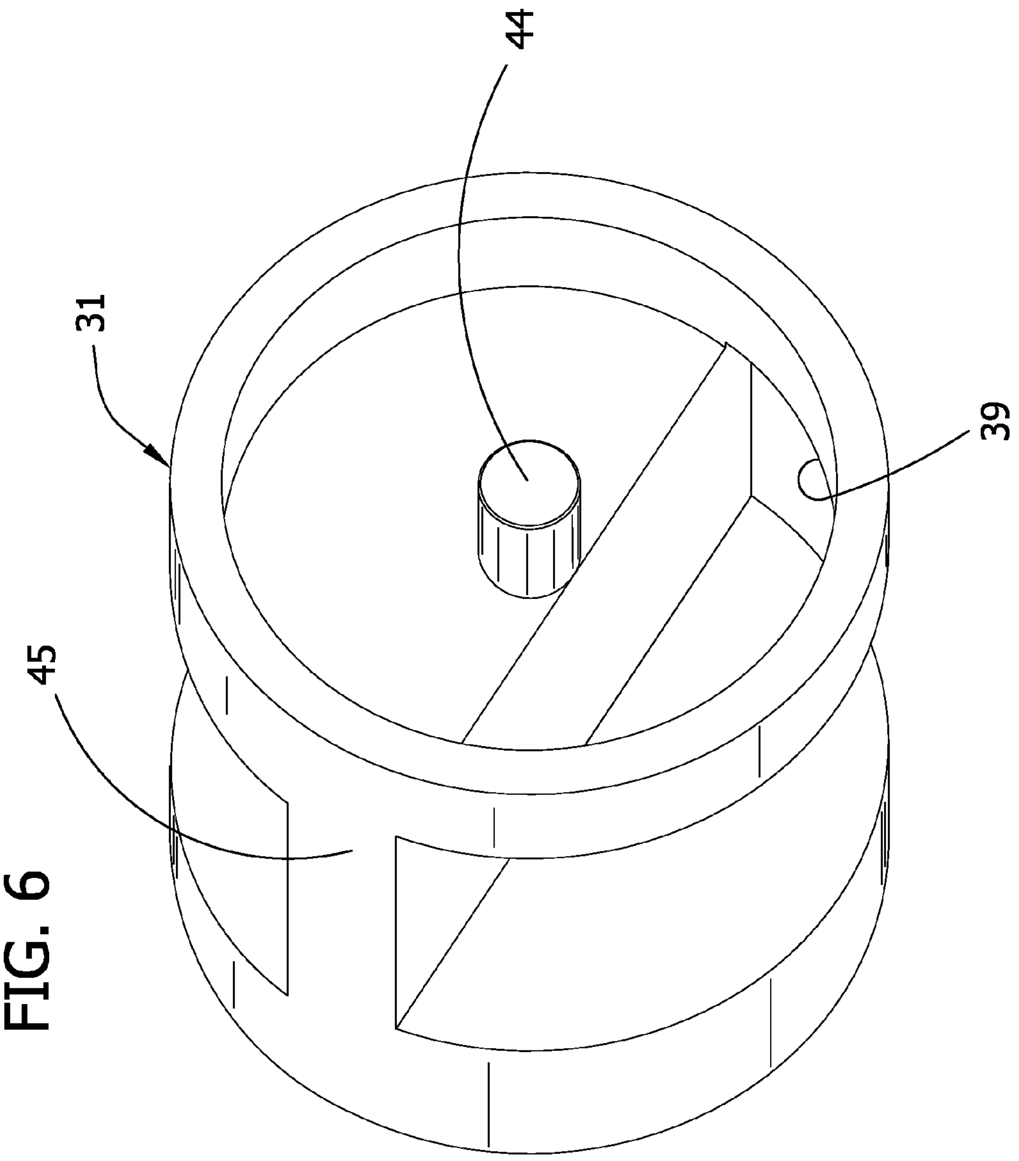
FIG. 6 is a perspective of a first valve member of the valve assembly.
Figure 7:
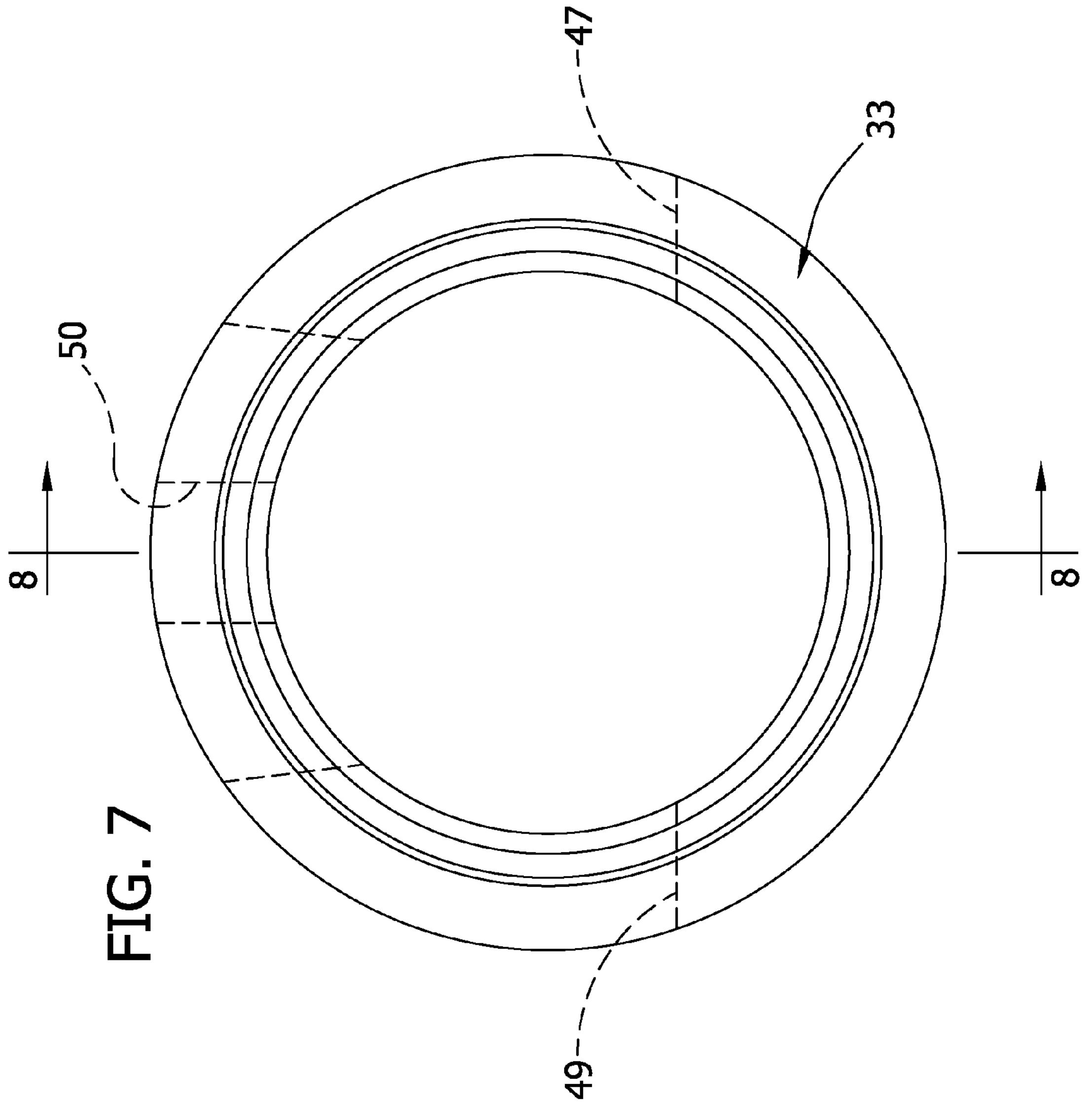
FIG. 7 is a front elevation of a second valve member of the valve assembly.
Figure 8:
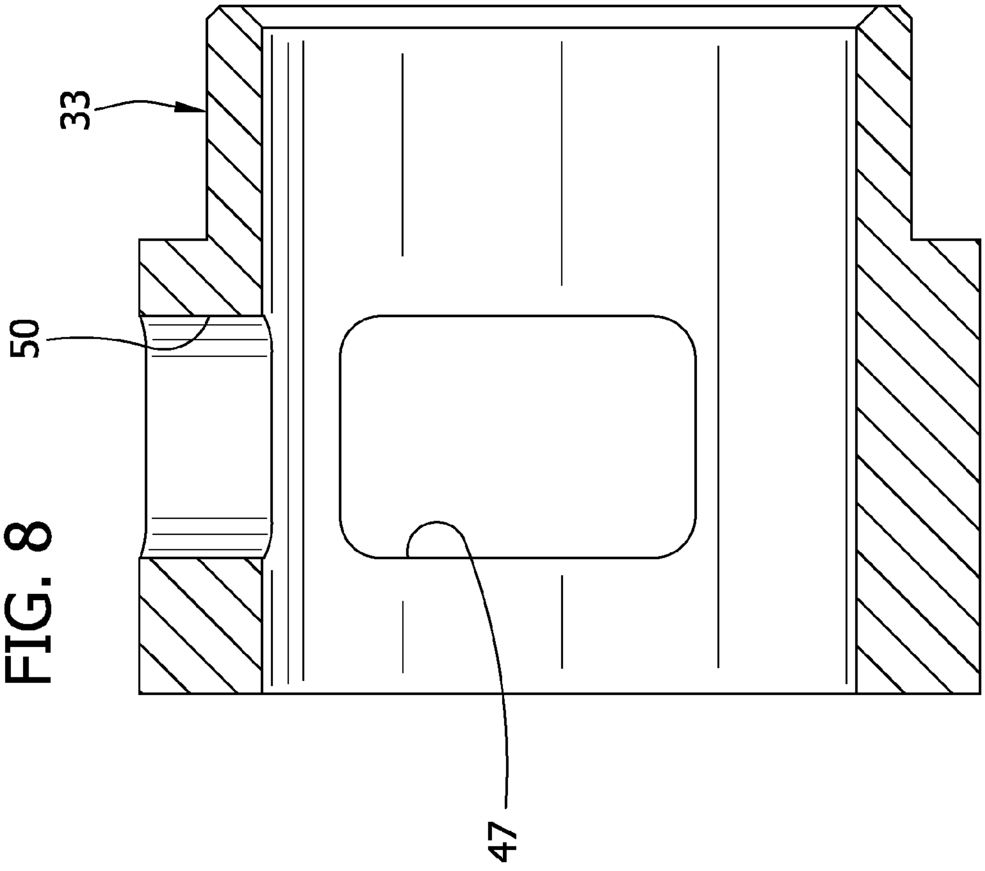
FIG. 8 is a cross-section of the second valve member taken on line 8-8 of FIG. 7.

Referring to FIG. 3, an air exhaust 19 is defined in the lower portion of the grip 11, adjacent the air inlet 15. The air exhaust 19 includes a diffuser 21 for directing exhaust air as it exits the tool away from the user and preventing foreign objects from entering the air exhaust 19.

Figure 9A:
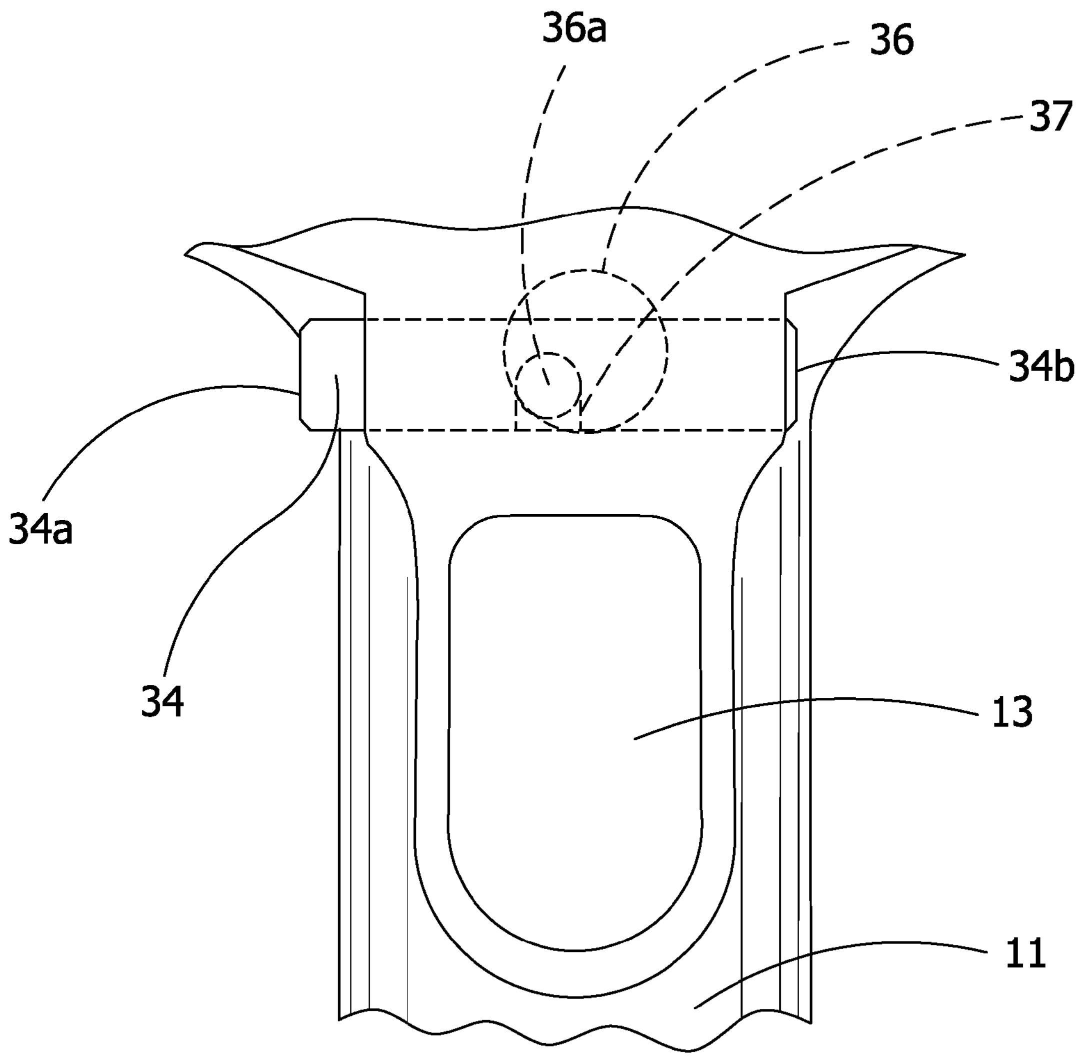
FIG. 9A is a fragmentary front elevation of the tool with part of a pin and a tab of the valve assembly shown by hidden lines, and with the valve assembly in a reverse operating position.
Figure 9B:
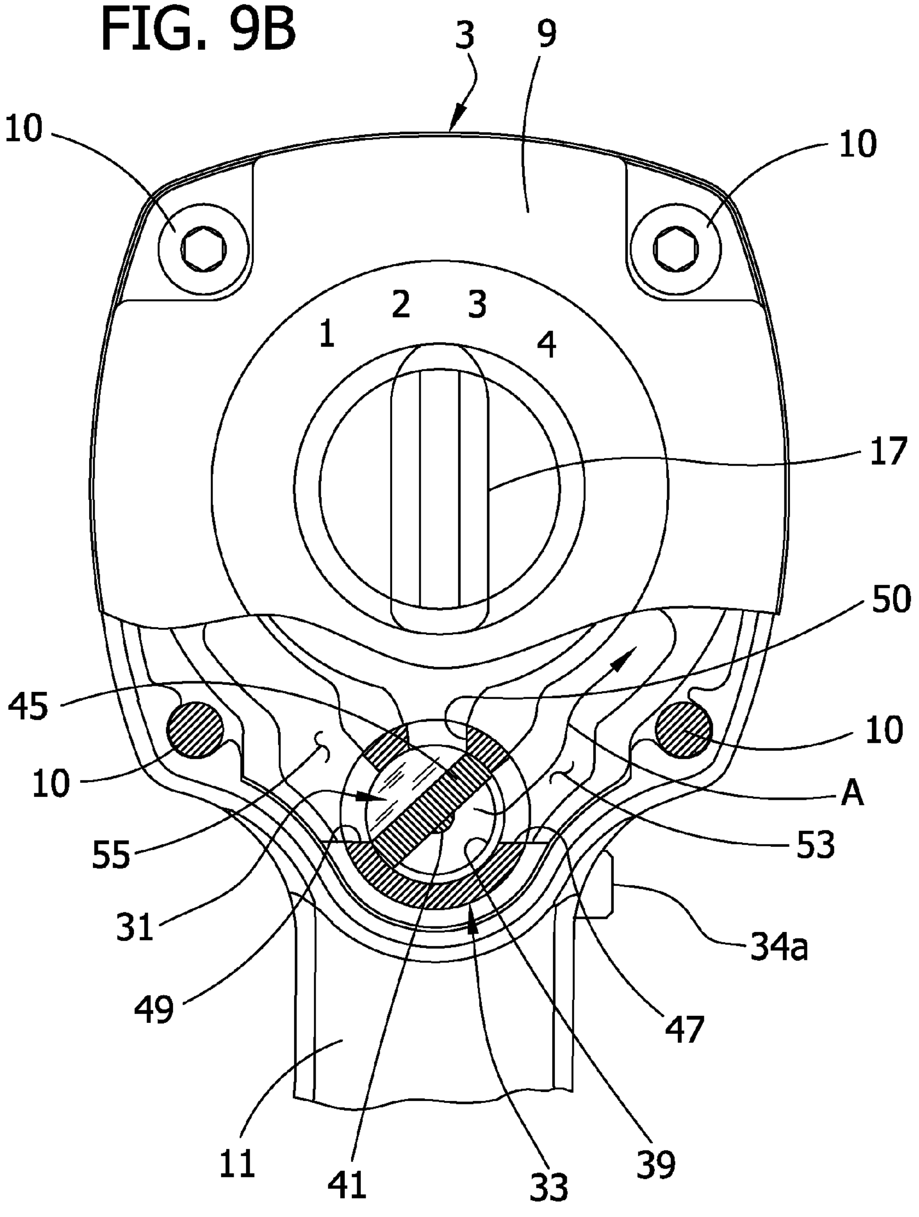
FIG. 9B is a fragmentary rear elevation of the tool with parts of an end cap and the valve assembly broken away, and with the valve assembly in the reverse operating position.
Figure 10A:
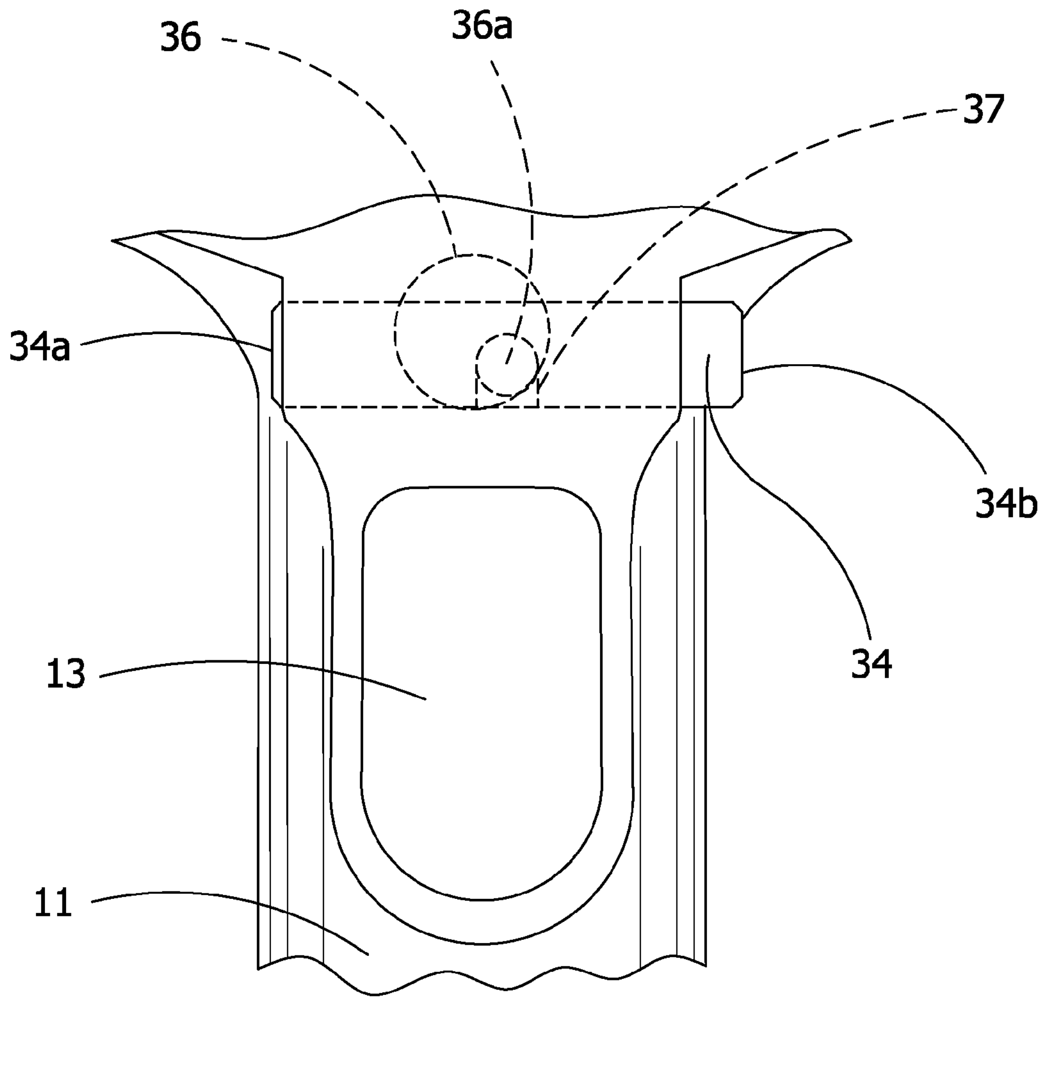
FIG. 10A is the elevation of FIG. 9A with the valve assembly in a forward operating position.
Figure 10B:
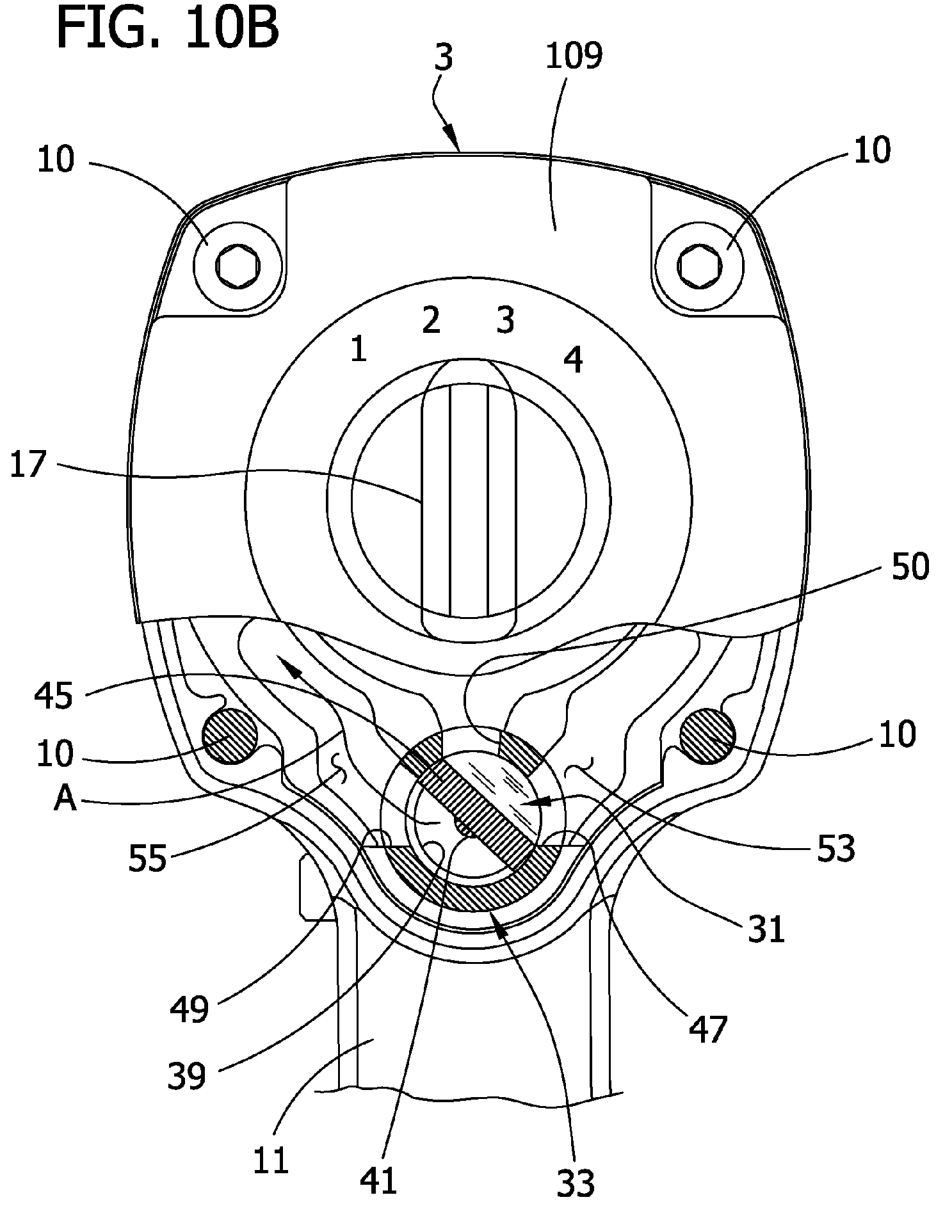
FIG. 10B is the elevation of FIG. 9B with the valve assembly in the forward operating position.

Air flow through passaging in the housing 3 of the tool 1 is indicated generally by line A in FIGS. 3, 9B, and 10B. Following the path of line A, pressurized air is first received into the tool 1 through the air inlet 15, which is more particularly defined by a fitting 23 for connecting the tool 1 to an air hose and source of pressurized air 16 as is known in the art. After the inlet 15, the air passes through a spring-biased tilt valve 25 that can be opened by pulling the trigger 13. The detailed construction and operation of the tilt valve 25 will not be discussed here, as the design is well known in the relevant art. The air then passes to a selector valve assembly, indicated generally at 27, located in the housing 3 just above the trigger 13.

As shown in greater detail in FIGS. 4-8, the selector valve assembly 27 comprises an elongate actuating pin 34 with first and second ends 34*a*, 34*b* (respectively) and longitudinal axis 35 operatively connected to a first valve member (indicated generally at 31) by a shaft 36 for rotatably moving the valve member within a second valve member (indicated generally at 33) fixed in position within the rear end of the tool 1 (FIG. 3). The first valve member 31, second valve member 33 and shaft 36 can be broadly referred to as a "valve", and the actuating pin 34 can be broadly referred to as an "actuator". The shaft 36 connects to the pin 34 at tab 36*a* in a slot 37 (the tab and slot can broadly be referred to as "connector elements") in the pin so that a longitudinal axis 38 (FIG. 5) of the shaft 36 is generally perpendicular to the longitudinal axis 35 of the pin 34. As better seen with reference to FIGS. 9A and 10A, the tab 36*a* is located off-center and thus away from the axis 38 of the shaft 36. The slot 37 is located generally below the longitudinal axis 35 of the pin 34 so that movement of the pin in a direction along its longitudinal axis 35 produces rotational movement of the shaft 36 about axis 38. The tab 36A moves conjointly with the slot 37 and pin 34 with respect to the lateral component of the tab's rotary movement about the axis 38. The vertical extent of the slot 37 allows the tab 36A to slide relative to the pin 34 in the slot so that the slot and tab do not move conjointly with respect to the vertical component of the tab's rotary motion. The shaft 36 connects to the first valve member 31 at an air opening 39 (FIG. 6) in the valve member. A semi-cylindrical finger 41 of the shaft 36 fits in the air opening 39 so that a flat surface of the finger lies against a bottom surface of a planar deflector 45 of the first valve member 31 (also see FIGS. 9B and 10B). The finger 41 is smaller than the air opening 39 so that air can still flow through the opening. An opening 42 in the finger 41 receives cylindrical extension 44 (FIG. 6) of the first valve member 31 for securing the finger to the valve member. Through this connection, the rotational movement of the shaft 36 conjointly rotates the first valve member 31. The first valve member and shaft 36 may be formed as one piece within the scope of the present invention.

As shown in FIG. 3, the actuating pin 34 is positioned generally above the trigger 13 for easy access. The pin 34 extends through a passage 43 through the housing 3, shielding it from inadvertent contact during operation. With additional reference to FIGS. 9A-10B, the pin 34 is moveable within the passage 43 between a first position (FIG. 9A) in which the first end 34*a* extends outward from the passage and a second position (FIG. 10A) in which the second end 34*b* extends outward from the passage. When the pin 34 is in the first position, the valve assembly 27 is in a reverse operating position (FIG. 9B). The planar deflector 45 of the first valve member 31 is rotated counter-clockwise (as viewed in FIG. 9B) about axis 38 so that air entering the second valve member 33 through the air opening 39 of the first valve member 31 is directed through a first side port 47 of the second valve member 33. When the pin 34 is in the second position, the valve assembly 27 is in a forward operating position (FIG. 10B). The deflector 45 is rotated clockwise (as viewed in FIG.

10B) about axis 38 so that air entering the second valve member 33 is directed by the deflector 45 through a second side port 49 of the second valve member 33. The second valve member 33 contains an additional top port 50, which provides an exit passage for exhausted air from the motor. It is noted that in FIG. 3, the first valve member 31 is shown in a neutral position, between the reverse operating position and the forward operating position.

Continuing to follow the path of air A through the tool 1 in FIGS. 3, 9B, and 10B, once the air passes through the selector valve assembly 27, the air travels through either a first air passage 53 or a second air passage 55, depending on the directional position of the first valve member 31 and deflector 45, toward a pneumatic rotary motor, indicated generally at 57 (FIG. 3). In FIG. 9B, air is directed through the first side port 47 and first passage 53 and passes through the torque selector 17. It then enters the motor 57 for driving the motor in a reverse operating direction, ultimately powering rotation of the output member 7 as will become apparent. In FIG. 10B, air is directed through the second side port 49 and second passage 55 and passes directly to the motor 57 for driving the motor in a forward operating direction.

The pneumatic rotary motor 57, as illustrated in FIG. 3, is of a type known to those skilled in the art and comprises a rotor 59 and a plurality of vanes 61. A similar pneumatic rotary motor is described in detail in the U.S. Pat. No. 6,796,386. Air enters the motor 57 and expands against the vanes 61 which in turn rotate the rotor 59. A support shaft 63 extends from the rear end of the rotor 59 and a splined shaft 65 extends from the forward end of the rotor 59. The support shaft 63 fits within a ball bearing 60 mounted within a rearward end cap **67*b* of the motor 57. The splined shaft 65 has a splined portion 65*a* and a smooth portion 65*b*. The smooth portion 65*b* fits within a ball bearing 60 mounted in a forward end cap 67*a* of the motor 57, while the splined portion 65*a* extends beyond the forward end cap 67*a* and engages an impact clutch, indicated generally at 69, housed in the clutch case 5. The splined portion 65*a* fits within a grooved hole 71 of the impact clutch 69 to allow conjoint movement. The splined shaft 65 and the support shaft 63 of the rotor 59 extend generally along the longitudinal axis 4 of the housing 3, and the two sets of ball bearings 60 allow the rotor 59 to rotate freely within the motor 57**.

As air travels through the air motor 57, it drives the splined shaft 65, which in turn drives the impact clutch 69 and output member 7. As is known in the art, the impact clutch 69 converts high speed rotational energy of the motor 57 into discrete, high torque impact moments on the output member 7. Because the high torque impacts are limited in duration, an operator can hold the tool 1 while imparting a larger moment to the output member 7 than would be possible were the high torque continually applied. Impact tools are useful for high torque applications, such as tightening or loosening a fastener requiring a high torque setting. The impact clutch 69 is of a type well known to those skilled in the art and will not be further described herein.

Air spent by the motor 57 is discharged through exhaust openings 73 in the motor and through port 50 of the second valve member 33. The spent air is then directed through orifices (not shown) in the housing 3 to the air exhaust 19 in the grip 11 for removal from the tool 1. This is conventional in the art.

FIGS. 11-16B illustrate a tool according to a second embodiment of the invention. The tool is indicated generally at 101, and parts of this tool corresponding to parts of the tool 1 of the first embodiment (FIGS. 1-10B) are indicated by the same reference numbers, plus "100".

Figure 12:
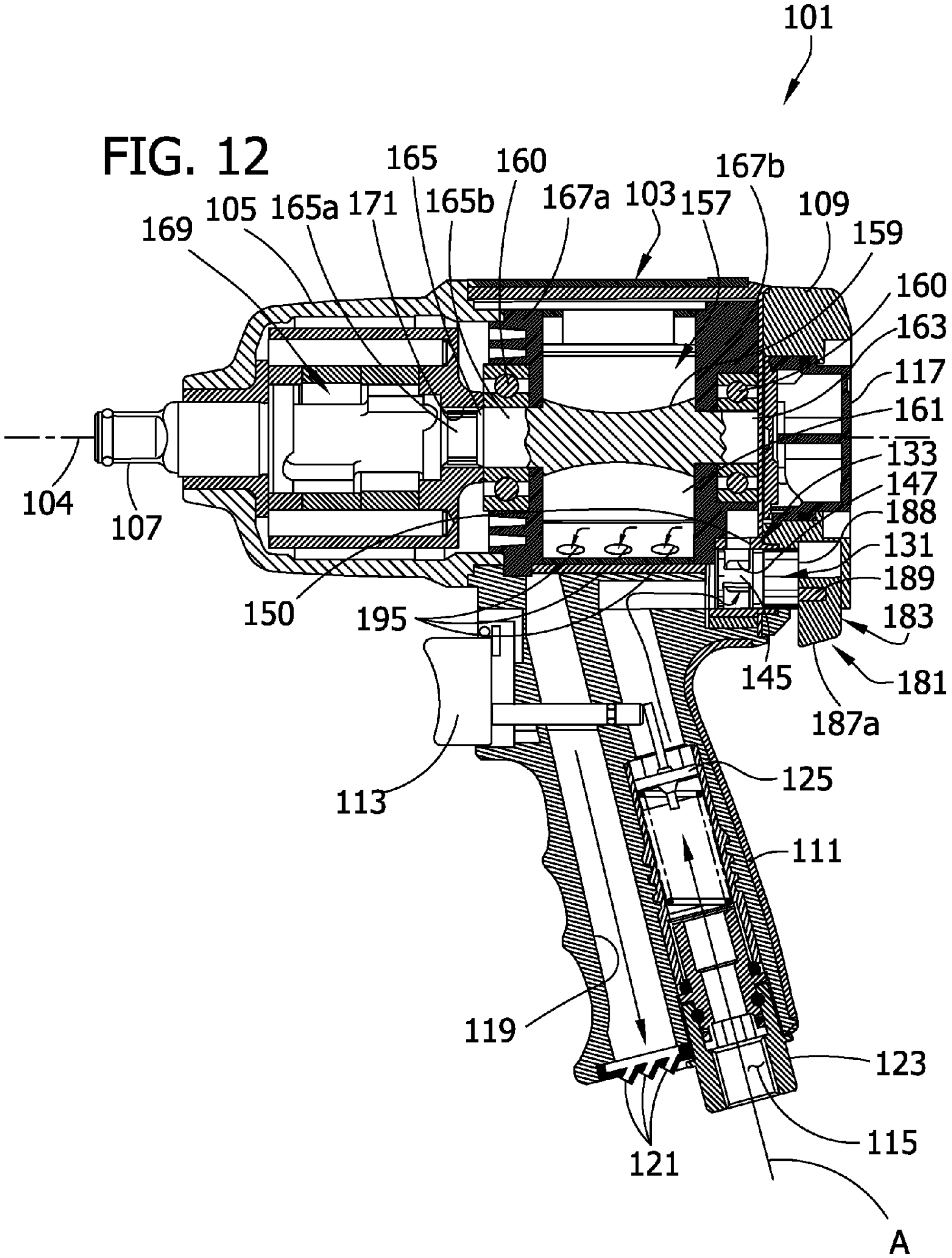
FIG. 12 is a vertical section thereof.
Figure 13:
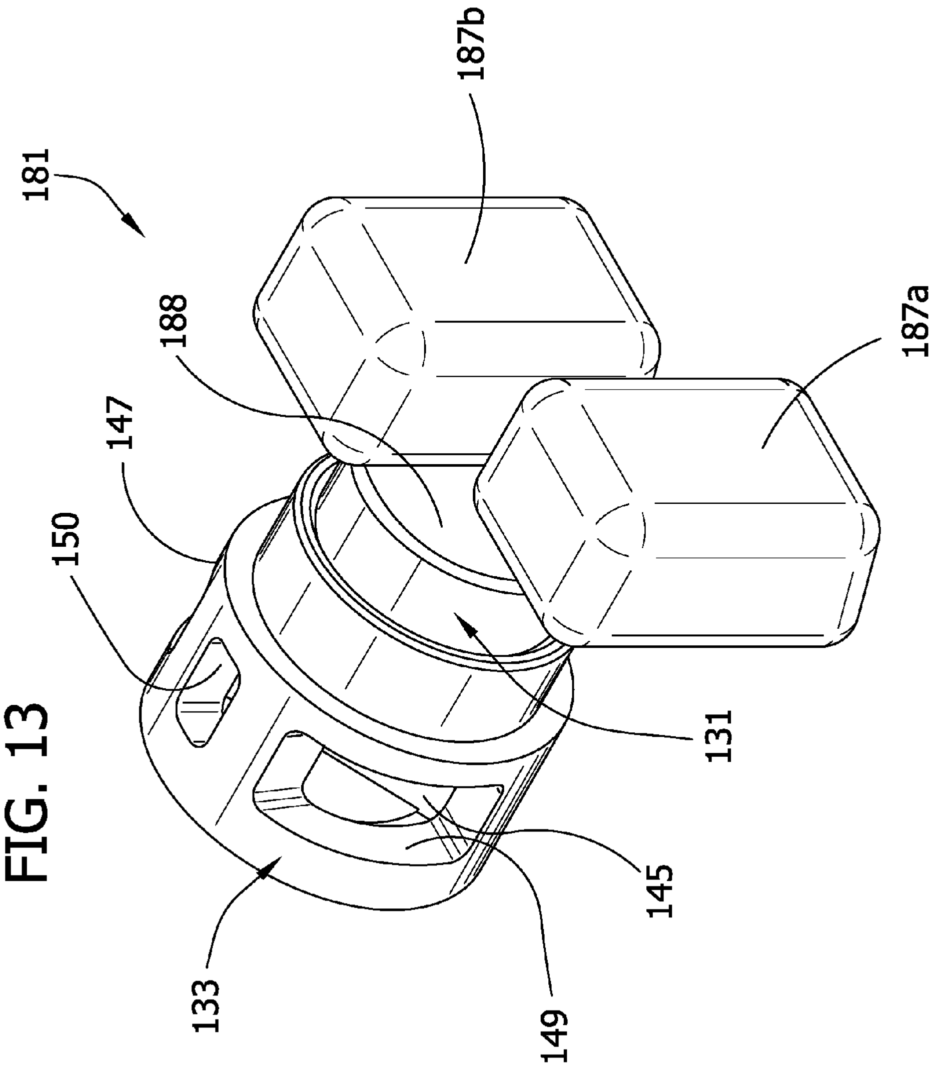
FIG. 13 is a perspective of a valve assembly and actuator of the tool of FIG. 11.
Figure 14:
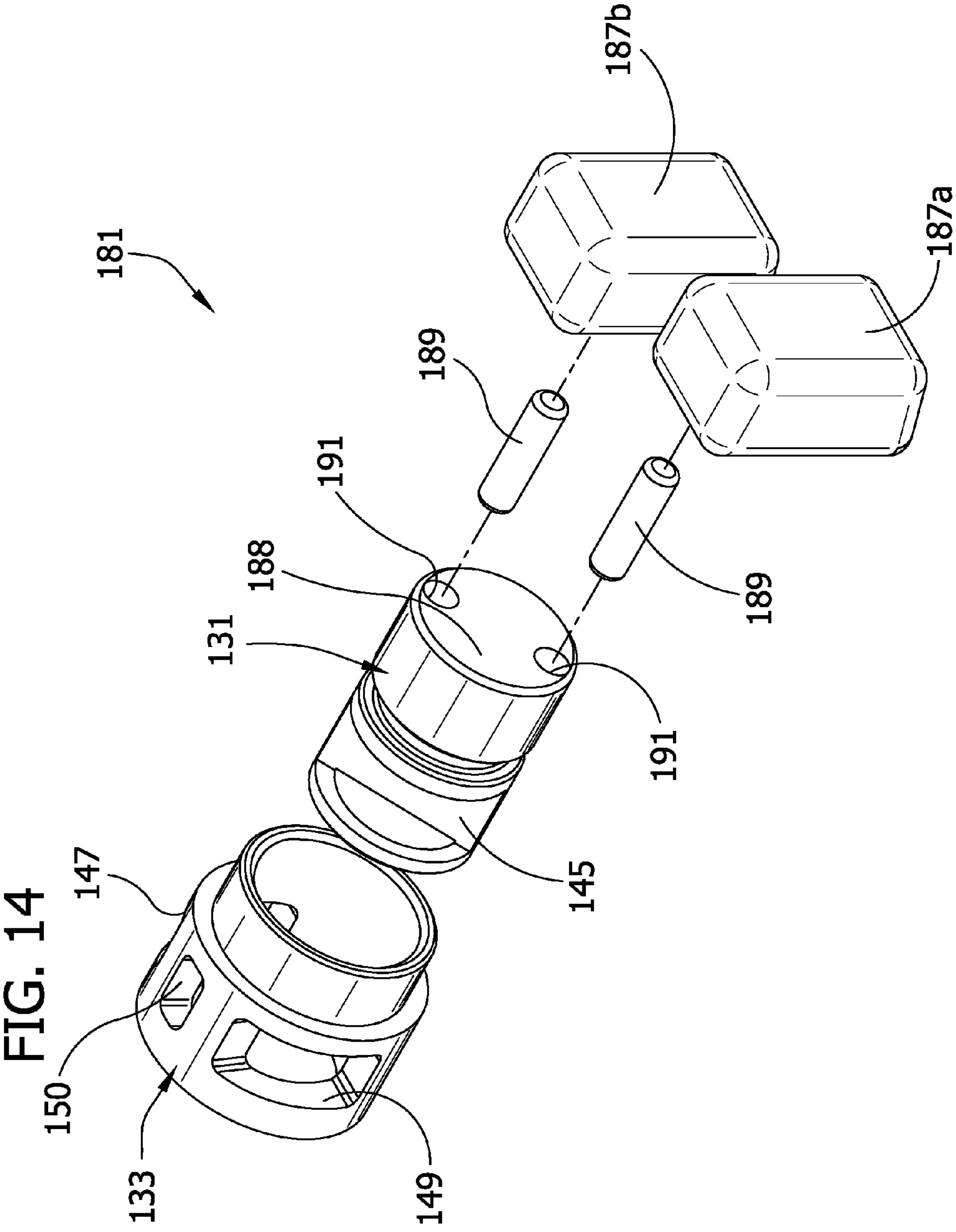
FIG. 14 is the perspective of FIG. 13 exploded.

As shown in FIGS. 11 and 12, the tool 101 of this embodiment is substantially similar to the tool 1 of the first embodiment. In this embodiment, however, a selector valve assembly 181 (FIGS. 12-14) is modified. The selector valve assembly 181 is located at a rear of the tool 101 generally under an end cover 109 of the tool. With additional reference to FIGS. 13 and 14, the selector valve assembly 181 comprises two push buttons **187*a*, 187*b* arranged side-by-side in parallel relation operatively connected to a first valve member (indicated generally at 131) for rotatably moving the valve member within a cylindrically shaped second valve member (indicated generally at 133) fixed in housing 103 (FIG. 12). The first valve member 131 and second valve member 133 can be broadly referred to as a "valve", and the push buttons 187*a*, 187*b* can be broadly referred to as an "actuator". The push buttons 187*a*, 187*b* connect to a major surface 188 of the first valve member 131 by pins 189 (broadly, "tabs") associated with the first valve member and which extend from openings 191 in the first valve member 131 and into slots 193 in the respective push buttons 187*a*, 187*b*. The slots 193 allow the push buttons 187*a*, 187*b* to move vertically relative to the housing 103 and produce the rotational movement of the first valve member 131 by accommodating the small amount of horizontal movement of the pins 189 resulting when the first valve member 131 rotates via a lost motion connection. It will be appreciated that other types of sliding lost motion connections may be used within the scope of the present invention. The push buttons 187*a*, 187*b* move in a substantially parallel direction to each other, and their direction of movement is substantially perpendicular to a longitudinal axis 104 of housing 103**.

Figure 15A:
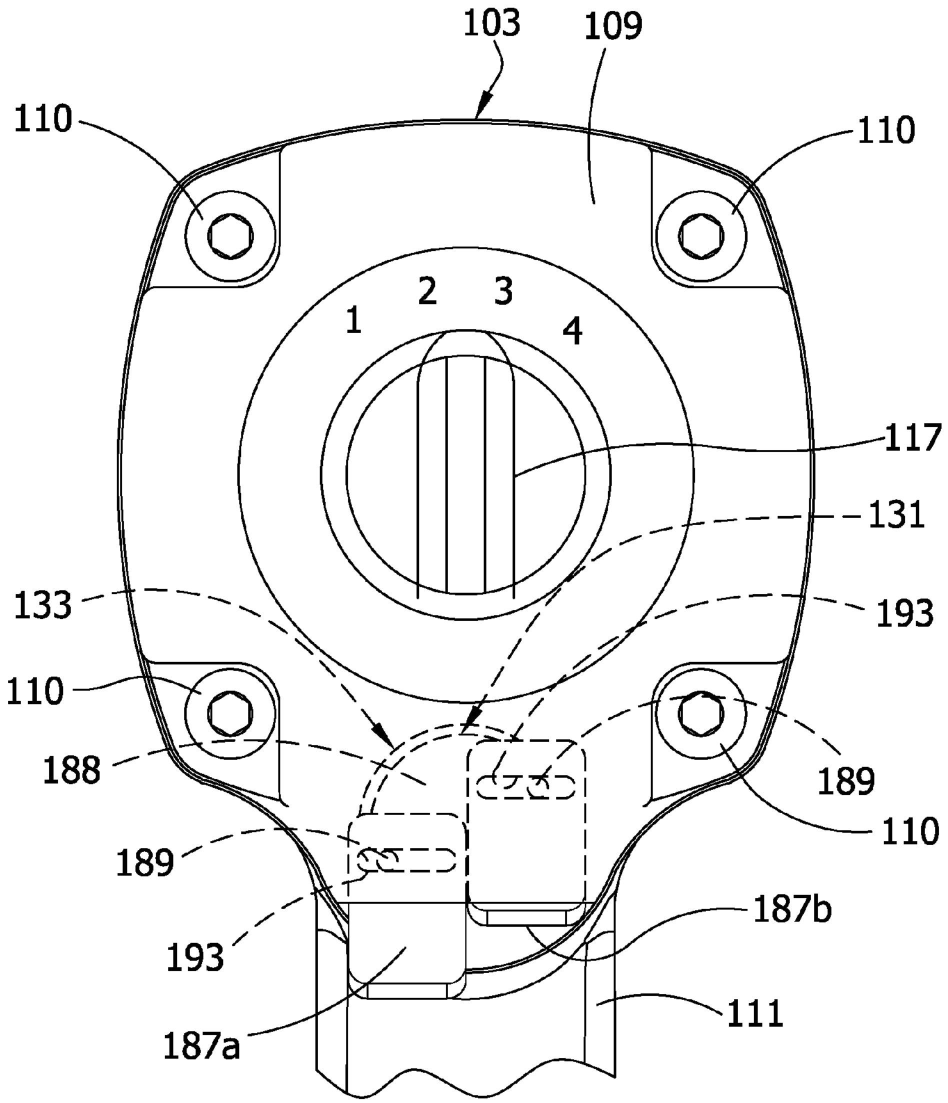
FIG. 15A is a fragmentary rear elevation of the tool of FIG. 11 with the valve assembly positioned to correspond to a forward operating position of the valve assembly.
Figure 15B:
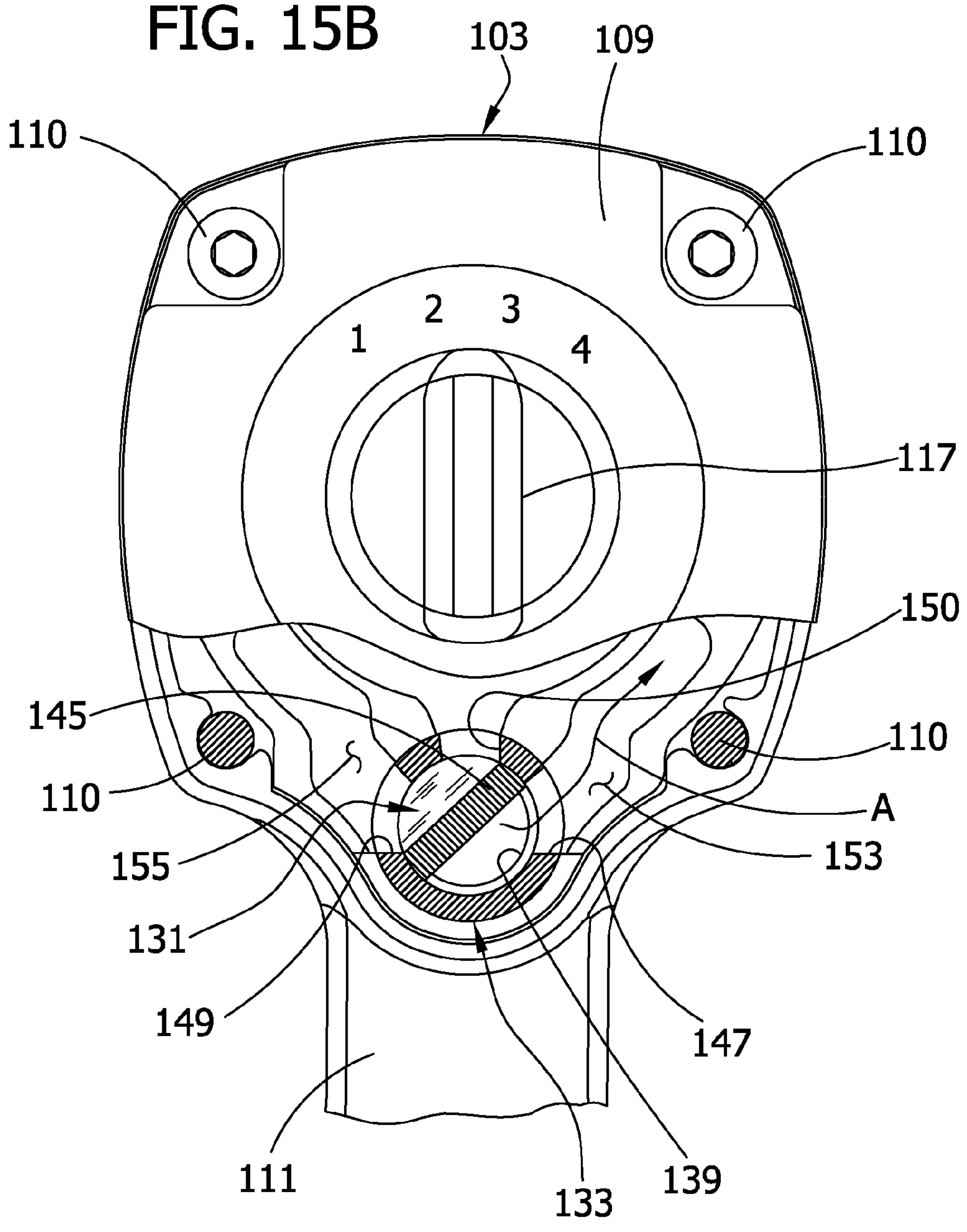
FIG. 15B is the fragmentary rear elevation of FIG. 15A with an end cap and the valve assembly partially broken away.
Figure 16A:
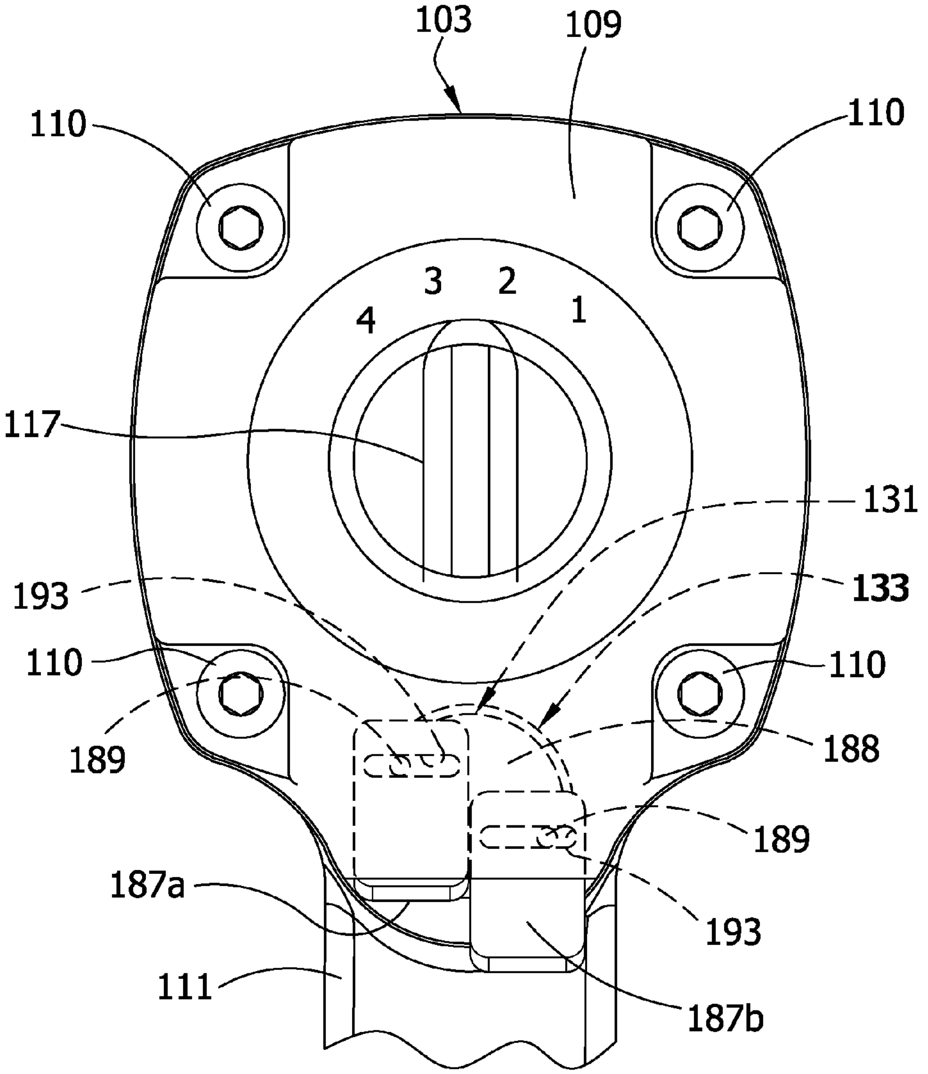
FIG. 16A is the elevation of FIG. 15A with the valve assembly positioned to correspond to a reverse operating position of the valve assembly.
Figure 16B:
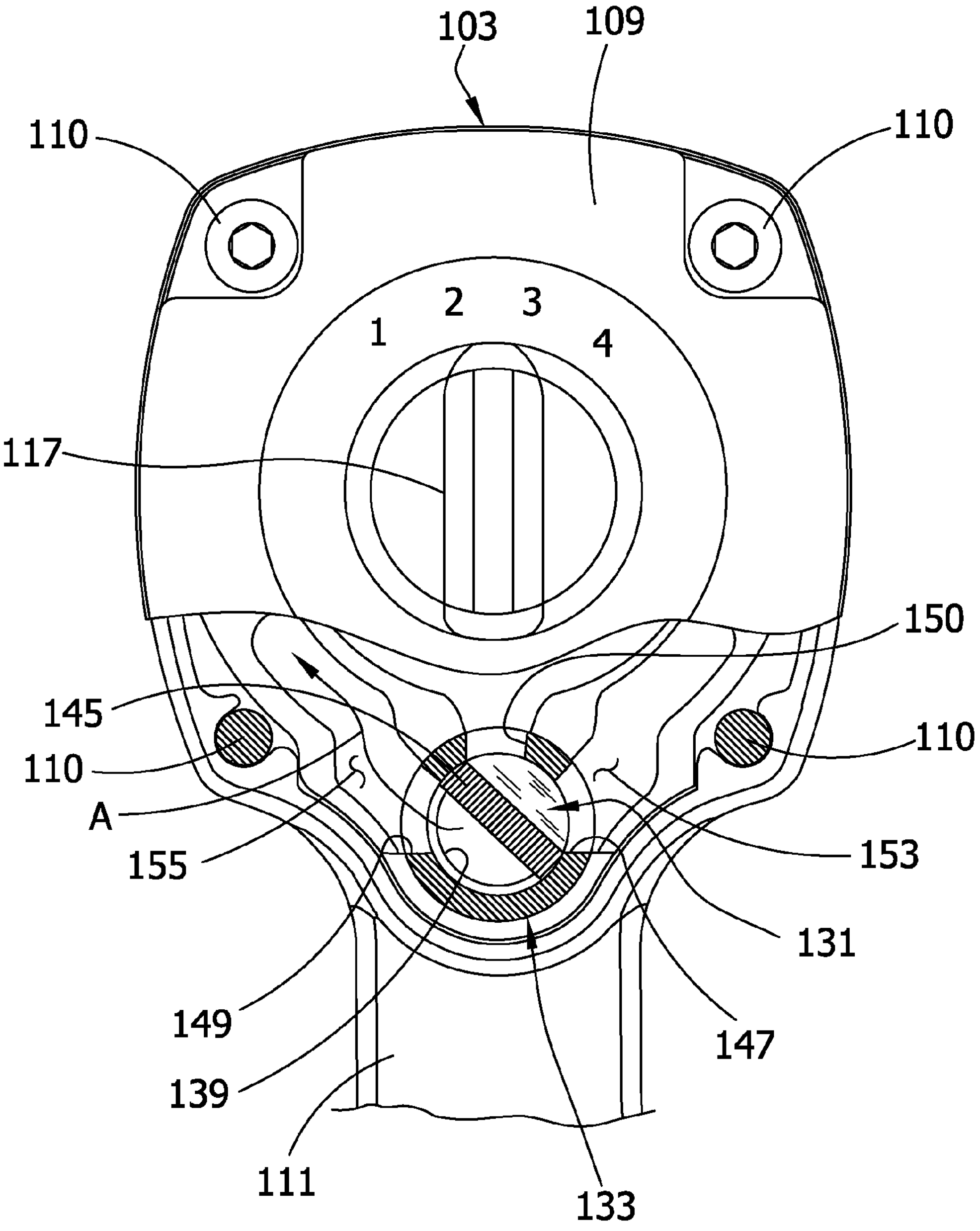
FIG. 16B is the fragmentary elevation of FIG. 16A with the end cap and the valve assembly partially broken away.

As shown in FIGS. 15A and 16A, the push buttons **187*a*, 187*b* of the valve assembly 181 are vertically positioned under the end cover 109, shielding them from inadvertent contact during operation. Portions of the push buttons 187*a*, 187*b* and second valve member 133 behind the end cover 109 are illustrated with broken lines in these figures. The push buttons 187*a*, 187*b* are moveable in a vertical direction so that either the first push button 187*a* or the second push button 187*b* extends below the end cover 109 while the other push button is substantially behind the end cover. In FIGS. 15A and 15B, the first push button 187*a* is below the end cover 109 and the valve assembly 181 is in a forward operating position. A deflector 145 of the first valve member 131 of the assembly 181 (similar to the deflector 45 of the first embodiment) is rotated counterclockwise from a horizontal position to an angle of about 45 degrees so that air entering the second valve member 133 through an air opening of the first valve member 131 (similar to air opening 39 of the first valve member 31 of the first embodiment) is deflected by the deflector through a first side port 147 of the second valve member and to a first air passage 153 in route to a motor 157 (FIG. 15B). Unlike the first embodiment, this configuration results in forward operation of the tool rather than reverse, because of a difference in the arrangement of the air motor (not shown). To change operation of the tool 101 to a reverse operating position, the first push button 187*a* is pressed upward, which rotates the first valve member 131 and moves the second push button 187*b* downward out of the housing 103 (FIG. 16A). The deflector 145 is rotated clockwise through horizontal to an angle of about 45 degrees so that air entering the second valve member 133 is deflected through a second side port 149 of the second valve member and to a second air passage 155 (FIG. 16B). By pushing the second push button 187*b*** upward, the tool is again configured for forward operation.

Also in this embodiment, and as shown in FIG. 12, spent air from the motor 157 is discharged through exhaust openings 195 toward a bottom of the motor 157. The spent air is then directed through orifices (not shown) in the housing 103 to an air exhaust 119 in a grip 111 for removal from the tool 101. In all other aspects, operation of the tool 101 of this embodiment is substantially the same as was described for the tool 1 of the first embodiment.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A pneumatic rotary tool comprising:

a housing;

an output member supported by the housing for rotational movement relative to the housing;

a pneumatic motor disposed in the housing and operatively connected to the output member for driving rotation of the output member;

an inlet in the housing for receiving pressurized air from a source of pressurized air to power the motor;

passaging in the housing for directing the pressurized air from the inlet to the pneumatic motor;

a valve having a longitudinal axis and being disposed in the passaging for rotary movement about said longitudinal axis between a first position in which pressurized air in the passaging is directed to power the pneumatic motor in a forward direction and a second position in which pressurized air in the passaging is directed to power the pneumatic motor in a reverse direction, said valve including a first valve member and a second valve member, the first valve member being rotatably received within the second valve member for rotational movement between the first position and the second position;

an actuator supported on the housing for translational movement relative to the housing; and a connector interconnecting the actuator and the valve, the connector comprising a slot formed in the actuator and a tab forming a crank projecting axially from an axial face of the valve, said said tab engaging the slot for generally conjoint movement in a first direction and for relative sliding movement in a second direction generally perpendicular to the first direction;

wherein the valve includes an elongate shaft operatively connecting the actuator to the first valve member, said shaft comprising a finger engageable with the first valve member so that rotation of the shaft conjointly rotates the first valve member, the finger of the shaft including an opening and the first valve member comprising an extension, the finger engaging the first valve member so that the opening receives the extension for securing the finger to the first valve; and wherein the connector imparts translational movement of the actuator to rotational movement of the shaft.

2. A pneumatic rotary tool as set forth in claim 1 wherein the slot extends generally perpendicular to the longitudinal axis of the valve.

3. A pneumatic rotary tool as set forth in claim 1 wherein the valve is mounted for rotational movement about the longitudinal axis and the actuator is mounted for translational movement.

4. A pneumatic rotary tool as set forth in claim 3 wherein the tab projects axially from an axially facing end of the valve and is located eccentrically of the longitudinal axis of the valve.

5. A pneumatic rotary tool as set forth in claim 4 wherein the actuator comprises a pin extending generally laterally of the housing and generally perpendicular to the longitudinal axis of the valve.

6. A pneumatic rotary tool as set forth in claim 5 wherein the pin comprises first and second opposite ends, the first end of the pin projecting out of the housing when the motor is operating in the forward direction and the second end of the pin projecting out of the housing when the motor is operating in the reverse direction.

7. A pneumatic rotary tool as set forth in claim 1 wherein the actuator comprises a first push button.

8. A pneumatic rotary tool as set forth in claim 7 wherein the actuator further comprises a second push button, the first push button being adapted to move the valve from the first position to the second position, and the second push button being adapted to move the valve from the second position to the first position.

9. A pneumatic rotary tool as set forth in claim 8 wherein the first and second push buttons are arranged side-by-side at a rearward end of the housing.

10. A pneumatic rotary tool as set forth in claim 1 wherein the valve comprises a planar deflector for directing the flow of air from the inlet through the valve in the passaging, the deflector directing the air to flow in one of a first direction and a second direction, air flowing in said first direction causing the motor to operate in the forward direction and air flowing in said second direction causing the motor to operate in the reverse direction.

11. A pneumatic rotary tool as set forth in claim 10 wherein the actuator is mounted for translational movement and the deflector is mounted for rotational movement about the longitudinal axis of the valve, the translational movement of the actuator producing the rotational movement of the deflector.

* * * * *